33-246
4/29/80    XR    4,200,355    SR

United States Patent [19]
Williams, Jr.

[11] 4,200,355
[45] Apr. 29, 1980

[54] TELESCOPIC SCOPE HAVING AN INTEGRALLY FORMED SADDLE

[75] Inventor: John B. Williams, Jr., Fullerton, Calif.

[73] Assignee: Fontaine Industries, Inc., Garden Grove, Calif.

[21] Appl. No.: 931,939

[22] Filed: Aug. 8, 1978

[51] Int. Cl.² ............................................. G02B 27/32
[52] U.S. Cl. ...................... 350/10; 350/54; 350/67; 33/246
[58] Field of Search ............ 350/10, 67, 61, 252, 350/242, 178, 319, 54; 33/245-246

[56] References Cited
U.S. PATENT DOCUMENTS

| | | | |
|---|---|---|---|
| 2,229,594 | 1/1941 | Seiler | 350/319 |
| 2,394,894 | 2/1946 | Burgert et al. | 350/178 |
| 3,297,389 | 1/1967 | Gibson | 350/10 |
| 3,386,330 | 6/1968 | Burris et al. | 350/10 |
| 3,597,040 | 8/1971 | Gotoh | 350/10 |
| 3,684,376 | 8/1972 | Lessard | 350/10 |
| 3,880,529 | 4/1975 | Althause et al. | 350/10 |

*Primary Examiner*—Jon W. Henry
*Attorney, Agent, or Firm*—Kay H. Boswell; Edward D. O'Brian

[57] ABSTRACT

A telescopic scope for use in conjunction with a firearm, the scope of the type having a tubular member, at least one eye-piece lens proximal to one end of the tubular member, at least one objective lens proximal to the other end of the tubular member, an erector lens system intermediate said eye-piece lens and said objective lens, a reticle intermediate said eye-piece lens and said objective lens, and turrets for adjusting the erector lens system can be improved by having the tubular member include a one-piece integrally formed main tube including a saddle integrally formed with the main tube intermediate the ends of the main tube. The scope is attached to the firearm by scope mounting rings which attach directly to the main tube. The erector lens system includes an erector tube which fits inside the main tube and contains at least one erector lens. The saddle and the main tube have two passage holes normal to the longitudinal axis of the main tube and normal to each other and mounted on the saddle over the passage holes are the turrets. The turrets are attached to adjustment screws which link to the erector tube and move the erector tube in response to movement of the turrets. The lenses are mounted to the main tube and to the erector tube utilizing a combination of lens seats and a flexible cradle ring. The flexible cradle rings fit over the lenses and in turn are held by the lens seats.

9 Claims, 3 Drawing Figures

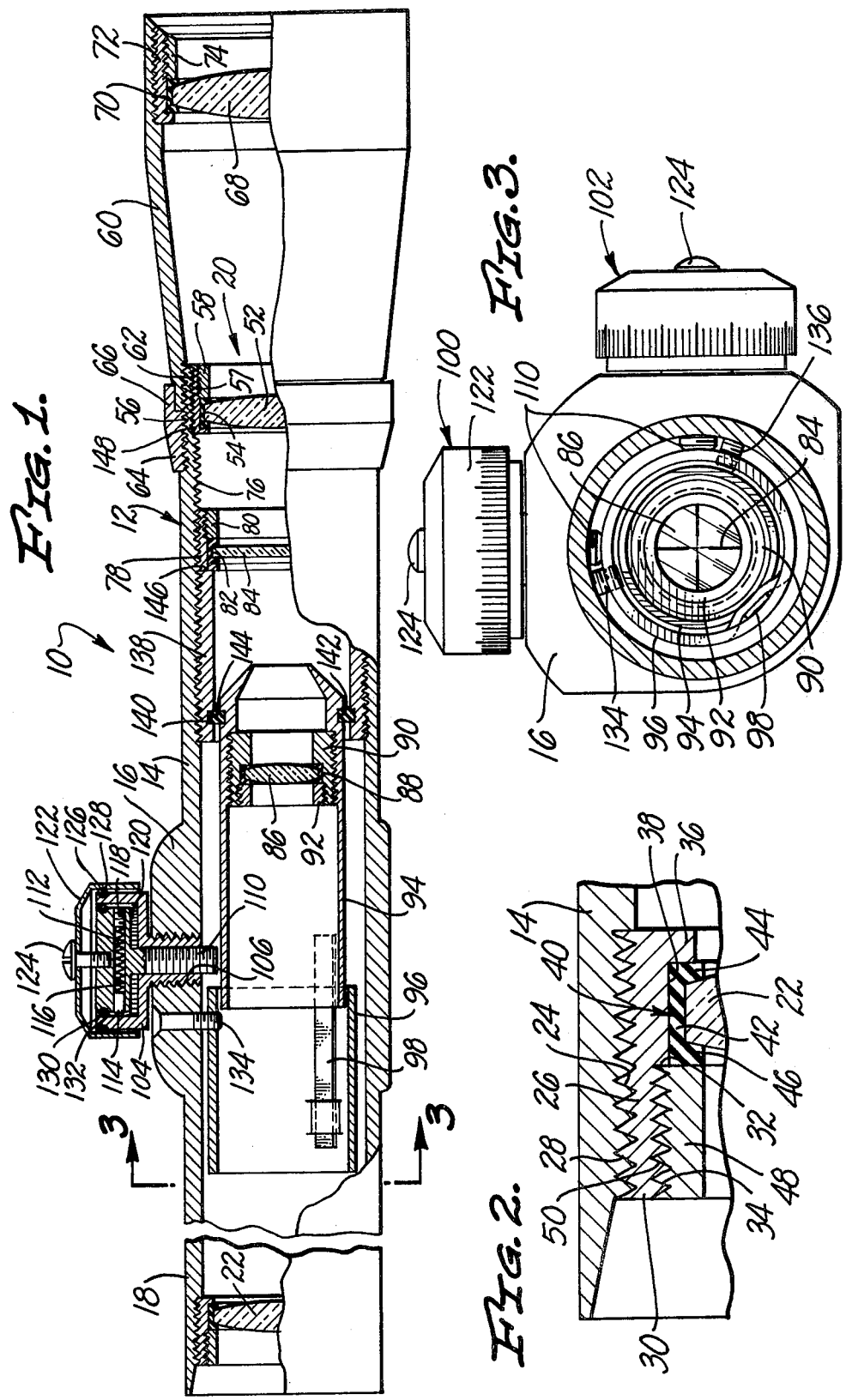

TELESCOPIC SCOPE HAVING AN INTEGRALLY FORMED SADDLE

BACKGROUND OF THE INVENTION

This invention is directed to an improvement in a telescopic scope utilized in conjunction with a firearm. The improvement comprises having a one-piece main tube with an integrally formed saddle and a lens mounting system utilizing semi-resilient lens cradle seats.

Telescopic scopes are used by both marksmen and hunters to increase their shooting accuracy during hunting and/or target practice. Generally these telescopic scopes incorporate a compound objective lens system and eye-piece lens system. Both of these lens systems are enclosed within a main tube and/or sections adapted to the main tube. By so placing the lens inside a tube the incidence of stray light reflecting through the lens system is minimized.

Incorporated within the scope can be crosshairs used to pinpoint the target. More advanced telescopic scopes utilize a reticle in place of the crosshairs. The reticle can be one of several types including dots, cross-hairs or wires. These can be etched into or painted onto a surface of a glass disk or they can be photoetched out of a metal disk.

In order to compensate for elevational and windage adjustments advance scopes utilize an erector system within the scope. The erector system consists of one or more lenses within the interior of the scope which are moved within the interior of the scope by connecting screws or rods attached to turrets mounted on the exterior of the scope. Normally one turret adjusts for elevation and a second turret placed 90 degrees to the first turret adjusts for windage.

When a firearm, especially a large bore rifle, is fired considerable force is generated and transmitted back to the rifle as recoil shock. Depending upon the caliber of the firearm and the load of the bullet, the recoil force which is generated can result in a shock which can be of the order of 10 G's. This recoil shock has the capability of damaging or causing misalignment within a telescopic scope attached to the firearm.

In prior art telescopic scopes having an erector lens system for elevational and windage adjustment it is standard practice to construct these scopes utilizing a split main tube. The adjusting knob or turrets for moving the erector lens or lens system are mounted to a saddle. In one class of prior art scopes both the front and rear sections of the main tube are screwed into or frictionally fitted into this saddle. In another class of prior art scopes the saddle is formed with either the front or rear section of the main tube. After insertion of the erector lens system into one section of the tube the other section is screwed into or frictionally fitted to the saddle.

Because of this construction these prior art scopes are susceptible to manufacturing defects due to inaccurate tolerances causing misalignment of the tubes when they are fitted into the saddle. Since the ultimate accuracy of the firearm is governed by the accuracy of its sights, said misalignment between the saddle and the tubes cannot be tolerated.

In addition to problems with manufacturing, the prior art telescopic scopes are also susceptible to damage by the recoil shock generated when the firearm is discharged. The recoil shock in certain instances can be strong enough to strip the threads wherein the tube component is joined to the saddle component. If the tube and saddle are frictionally fitted or glued together the recoil shock can be sufficient to overcome the frictional forces and/or glue holding the components together causing the components to fly apart when the firearm is discharged.

It has been the practice in constructing these prior art telescopic scopes to secure the lenses to the tubes of the scope by fitting the lenses against a shoulder or flange and then holding the lens against the shoulder or flange by means of a lock ring. Normally the shoulder or flange is part of a ring screwing into the main tube and the lock ring then screws into this ring. In the prior art scope wherein the lenses are so mounted again owing to the recoil shock generated by the discharge of the firearm, the lenses, because they are in direct contact with the metal shoulders or flanges and lock rings, tend to become chipped, or misaligned with repeated discharging of the firearm.

BRIEF SUMMARY OF THE INVENTION

In view of the above it is felt that there is a need for new and improved telescopic scopes for firearms. It is an object of this invention to fulfill this need. It is a further object of the invention to provide a telescopic scope wherein the saddle is integrally formed with the main tube and thus is not subject to misalignment or inadvertent decoupling of the tube from the saddle. It is an additional object to provide a telescopic scope wherein the lens systems are protected from direct glass to metal contact. It is still a further object to provide a telescopic scope that can be manufactured to exceedingly close tolerances and thus provide for very accurate coordination between a marksman and his firearm.

These and other objects and advantages are achieved in a telescopic scope of the type having a tubular member, said tubular member capable of fitting into scope mounting rings attaching said scope to a firearm, at least one eye-piece lens system proximal to one end of said tubular member, at least one objective lens system proximal to the other end of said tubular member, an erector system intermediate said eye-piece lens system and said objective lens system, a reticle intermediate said erector system and said objective lens system, two turrets for adjusting the erector system, the improvement which comprises: said tubular member including a one-piece integrally formed main tube, a saddle integrally formed on said main tube intermediate the ends of the main tube, the erector system including an erector tube, the erector tube fitting inside the main tube, at least one erector lens within the erector tube, the integrally formed saddle and main tube having two passage holes normal to each other and normal to the longitudinal axis of said main tube, the turrets mounted on the saddle over the passage holes and including a linking member passing through the passage holes and connecting the turrets to the erector tube.

BRIEF DESCRIPTION OF THE DRAWING

The presently preferred embodiment of the telescopic scope of the invention can best be described taken in conjunction with the drawings wherein:

FIG. 1 is a side elevational view, in section;

FIG. 2 is a sectional view showing, in detail, the extreme left portion of the scope illustrated in FIG. 1;

FIG. 3 is an end elevational view taken at the lines 3—3 of FIG. 1;

The invention in this specification utilizes certain concepts or principles as are set forth and defined in the appended claims. Those skilled in the art of telescopic scopes will realize that these principles or concepts can be applied to a number of differently appearing embodiments through the use of routine engineering skill. For this reason the invention is not to be construed as limited to the exact embodiment illustrated but is to be construed in light of the claims.

DETAILED DESCRIPTION

The telescopic scope 10 illustrated in the figures has a tubular member 12 which is integrally formed as a one-piece unit. The tubular member 12 for ease of description in this specification can be described as being composed of a main tube 14 having a saddle 16 circumventing the main tube 14 intermediate the objective end 18 and the eye-piece end 20. The tubular member 12 is constructed and machined as a solid one-piece unit.

An objective lens 22, shown as a single lens in the figures for illustrative purposes, is mounted in the objective end 18. This lens 22 can be a compound lens, the individual lenses together form the objective lens 22, or it can be a single lens. The objective end 18 of main tube 14 is threaded with internal threads 24 in to which threads a seat ring 26. Seat ring 26 has external threads 28 along its outer surface which mate with internal threads 24 on main tube 14. Extending along a portion of the interior portion (not separately numbered) of seat ring 26 from end 30 to an intermediate point 32 are interior threads 34. On the opposite end of seat ring 26 is an annular flange 36 which projects inwardly toward the center of seat ring 26. Between flange 36 and intermediate point 32 the interior of seat ring 26 is smooth forming a flat annular ring section 38.

A flexible cradle ring 40 having a flat annular ring 42 and an interior directed flange 44 and 46 on each end, respectively, fits against the inside of the flat annular ring portion 38 of seat ring 26 essentially as illustrated in FIG. 2. A lock ring 48 having external threads 50 threads into seat ring 26 and retains flexible cradle ring 40 against flange 36. The objective lens 22 fits between flanges 44 and 46 on flexible cradle ring 40 and is retained in seat ring 26 cradled within flexible ring 40.

Flexible ring 40 is made up of neoprene rubber or some other semiresilient but flexible rubber or plastic material. Objective lens 22 and other lenses as hereinafter described are cradled within flexible cradle ring 40 or a similar ring and thus any lens to metal contact is prevented. During recoil the shock transmitted to the scope 10 by the firearm (not shown) is absorbed by the cradle ring 40 and not transmitted in its full force to the lenses of the scope 10.

At eye-piece end 20 of main tube 14 is a first eye-piece lens 52 which is maintained within a flexible cradle ring 54 in an identical manner as previously described for the objective lens 22. Cradle ring 54 is retained in seat ring 56 by lock ring 58 again as previously described. Seat ring 56 in turn screws into internal screw threads 57 in main tube 14. A frusto-conical shaped extension 60 having internal screw threads 62 on its small end screws onto external screw threads 64 on the one-piece end 20 of main tube 14.

A lock ring 66 also threads onto external threads 64. A second eye-piece lens 68 is maintained in cradle ring 70 which in turn fits into seat ring 72 and is held there by lock ring 74 as previously described for the other lenses. To focus the scope 10, bell shaped extension 60 is turned on main tube 14, moving the second eye-piece lens 68 in respect to first eye-piece lens 52. Lock ring 66 is used to lock bell shaped extension 60 in place once the desired focus has been achieved.

Eye-piece lenses 52 and 68 are shown as single lenses. As with objective lens 22 the eye-piece lenses 52 and 68 can be compound lenses and in addition, additional lenses could be added to the existing two eye-piece lenses 52 and 68. Any additional lenses if used would be retained in ring seats utilizing cradle rings as described for lenses 22, 52 and 68. Eye-piece lens end 20 of main tube 14 contains an additional interior screw thread 76 projecting inside the tube past eye-piece lens 52. A seat ring 78 having a lock ring 80 fitted with a cradle ring 82 screws into thread 76 and retains a reticle 84 in the cradle ring 82, in a manner previously described for the lenses. Generally the reticle 84 will be a photoetched metal disk which can be interchanged with other similar disks having different crosshair grids, dots or other patterns thereon. The particular pattern etched on the reticle will depend upon the need of the shooter.

An erector lens 86 is maintained in a cradle ring 88 in a seat ring 90 and lock ring 92 as previously described for the other lenses and reticle. Seat ring 90 fits into erector tube 94. The erector tube 94 fits inside a support tube member 96 and is biased by a spring 98 toward a point corresponding to the 315 degree mark of a circle. The spring 98 is attached to the support member 96 at a position corresponding to about 225 degrees. Two turrets 100 and 102 are placed on saddle 16 at zero and 270 degrees, respectively.

An elevational turret 100 and a windage turret 102, which are wholly conventional in construction are mounted on saddle 16. The components of both turrets 100 and 102, since they are identical, will be described using identical numbering for the identical features. The turret bases 104 screw into passage holes 106 and 108 passing through saddle 16 beneath elevational turret 100 and the windage turret 102, respectively. A threaded member 110 screws into the turret base 104 and fits against the erector tube 94. Within the threaded member 110 is a hole 112 having a pointed peg 114 fitting therein. The peg 114 is biased toward one side of the threaded member 110 by a spring 116 which in turn is retained within the hole 112 by a screw plug 118. Within the interior of turret base 104 are a symmetrical array of ridges collectively identified by the number 120.

A turret cap 122 attaches to member 110 by a screw 124. Turret base 104 has a small groove 126 around its exterior. An O-ring 128 fits in this groove 126 and seals between turret cap 122 and turret base 104. Along the upper surface of turret member 110 is a second groove 130 having an O-ring 132 which fits against and seals turret member 110 against turret base 104. Turret member 110 is turned by turret cap 122 and peg 114 fits within the ridges 120 positioning and holding turret member 110 in respect to turret base 104. As turret member 110 is turned erector tube 94 is displaced within the interior of main tube 14. Elevational turret 100 displaces the erector tube 94 in a vertical direction correcting for elevational changes and windage turret 102 being at a 270 degree angle from elevational turret 100 displaces erector tube 94 in a horizontal direction correcting for windage changes.

Support member 96 is connected to main tube 14 by two screws 134 and 136, one fitting underneath the elevational turret 100 and the other fitting under the windage turret 102.

An erector tube positioning ring 138 also screws into threads 76. Positioning ring 138 has a groove 140 and the erector tube 94 has a corresponding groove 142. A neoprene ring 144, which when viewed in cross-section is square, fits within grooves 140 and 142 and retains the end of the erector tube 94 nearest the eye-piece lens 20 in place within main tube 14. Since ring 144 is a semi-flexible ring it allows for movement of the erector tube 94 in response to the elevational turret 100 and the windage turret 102. The end 146 of erector tube positioning ring 138 serves as a shoulder for the reticle holding seat ring 78 to fit against. The shoulder 148 between threads 76 and 57 serves as a seat for first eye-piece seat ring 56 to fit against.

The reticle 84 is illustrated as being located between the erector lens 86 and eye-piece lens 52. It could, however, be located near the objective end 18 of the scope 10 between the objective lens 22 and the erector lens 86.

In use the scope 10 is mounted on a firearm (not illustrated). The mounting rings fit around main tube 14 and for added stability in mounting the saddle 16 can be placed directly in front of a scope mounting ring.

I claim:

1. In a telescopic scope of the type having a tubular member, said tubular member capable of fitting into scope mounting rings attaching said scope to a firearm, at least one eye-piece lens means proximal to one end of said tubular member, at least one objective lens means proximal to the other end of said tubular member, an erector means intermediate said eye-piece lens means and said objective lens means, a reticle means intermediate said eye-piece lens means and said objective lens means, turret means, the improvement which comprises:

said tubular member including a one-piece integrally formed main tube;
said tubular member including a saddle integrally formed on said main tube intermediate the ends of said main tube, said saddle circumventing said main tube;
said scope mounting rings attaching to said main tube;
said erector means including an erector tube;
said erector tube fitting inside said main tube;
at least one erector lens means;
said erector lens means mounted in said erector tube;
said saddle and said main tube including at least one passage hole;
said passage hole normal to the longitudinal axis of said main tube;
said turret means mounted on said saddle;
at least one erector adjustment linking member means;
said erector adjustment linking member passing through said passage hole to the interior of said main tube and linking said turret means to said erector tube.

2. The scope of claim 1 wherein:
said saddle and said main tube includes two passage holes;
said passage holes being mutually normal to the longitudinal axis of said main tube and to each other;
said turret means includes two turrets mounted on said saddle over said holes;
two erector adjustment linking member means;
each one of said erector adjustment linking member means passing through one of said passage holes to the interior of said main tube and each linking one of said turrets to said erector tube.

3. The scope of claim 2 wherein:
said eye-piece lens means includes at least one eye-piece lens;
said object lens means includes at least one object lens;
at least two lens cradle means;
said eye-piece lens and said object lens each mounted in one of said lens cradle means;
said lens cradle means attaching to said tubular member.

4. The scope of claim 3 wherein:
said erector lens means includes at least one erector lens;
said reticle means includes a reticle;
at least four lens cradle means;
said eye-piece lens, said object lens, said erector lens and said reticle each mounted in one of said lens cradle means.

5. The scope of claim 4 wherein:
said lens cradle means includes a seat means and a flexible cradle ring means;
said flexible cradle ring means fitting into said seat means.

6. The scope of claim 5 wherein:
said seat means includes a seat ring and a lock ring;
said flexible cradle ring means comprising a flexible cradle ring;
said flexible cradle ring fitting around the outside perimeter of a lens;
said flexible cradle ring and said lens fitting inside said seat ring;
said lock ring locking said flexible cradle ring and said lens in said seat ring.

7. In a telescopic scope of the type having a tubular member, said tubular member capable of fitting into scope mounting rings attaching said scope to a firearm, at least one eye-piece lens means proximal to one end of said tubular member, at least one objective lens means proximal to the other end of said tubular member, an erector means intermediate said eye-piece lens means and said objective means, a reticle means intermediate said eye-piece lens means and said objective lens means, turret means, the improvement which comprises:

said tubular member including a one-piece integrally formed main tube;
said tubular member including a saddle integrally formed on said main tube intermediate the ends of said main tube, said saddle circumventing said main tube;
said scope mounting rings attaching to said main tube;
said erector means including an erector tube;
said erector tube fitting inside said main tube;
at least one erector lens means;
said erector lens means mounted in said erector tube;
said saddle and said main tube includes two passage holes;
said passage holes being mutually normal to the longitudinal axis of said main tube and to each other;
said turret means includes two turrets mounted on said saddle over said holes;
two erector adjustment linking member means;
each one of said erector adjustment linking member means passing through one of said passage holes to the interior of said main tube and each linking one of said turrets to said erector tube;

said eye-piece lens means includes at least one eye-piece lens;
said object lens means includes at least one object lens;
said erector lens means includes at least one erector lens;
said reticle means includes a reticle;
at least four lens cradle means;
said eye-piece lens, said object lens, said erector lens and said reticle each mounted in one of said lens cradle means;
said lens cradle means includes a seat means and a flexible cradle ring means;
said flexible cradle ring means fitting into said seat means;
said seat means includes a seat ring and a lock ring;
said flexible cradle ring means comprising a flexible cradle ring;
said flexible cradle ring fitting around the outside perimeter of a lens;
said flexible cradle ring and said lens fitting inside said seat ring;
said lock ring locking said flexible cradle ring and said lens in said seat ring;
said seat ring comprises a first cylindrical member;
said first cylindrical member including external screw threads on its outer surface;
said first cylindrical member including an inward projecting annular flange on one end of said first cylindrical member;
said first cylindrical member including internal screw threads extending on the interior surface of said first cylindrical member from said end not having said flange a portion of the way toward said end having said flange;
said flexible cradle ring comprising a flexible annular flat ring;
said annular flat ring including an inward projecting annular flange on both ends of said annular flat ring;
said lock ring comprises a second cylindrical member having external screw threads on its outer surface.

8. In a telescopic scope of the type having a tubular member, said tubular member capable of fitting into scope mounting rings attaching said scope to a firearm, at least one eye-piece lens means proximal to one end of said tubular member, at least one objective lens means proximal to the other end of said tubular member, an erector means intermediate said eye-piece lens means and said objective lens means, a reticle means intermediate said eye-piece lens means and said objective lens means, turret means, the improvement which comprises:
said eye-piece lens means including at least one eye-piece lens;
said object lens means including at least one object lens;
said erector lens means including at least one erector lens;
said reticle means including a reticle;
at least four lens cradle means;
said eye-piece lens, said object lens, said erector lens and said reticle each mounted in one of said lens cradle means;
said lens cradle means including a seat means and a flexible cradle ring means;
said flexible cradle ring means fitting into said seat means;
said tubular member includes a one-piece integrally formed main tube;
said tubular member includes a saddle integrally formed on said main tube intermediate the end of said main tube, said saddle circumventing said main tube.

9. The scope of claim 8 wherein:
said erector means includes an erector tube;
said erector tube fitting inside said main tube;
at least one erector lens means;
said erector lens means mounted in said erector tube;
said saddle and said main tube includes two passage holes;
said passage holes being mutually normal to the longitudinal axis of said main tube and to each other;
said turret means includes two turrets mounted on said saddle over said holes;
two erector adjustment linking member means;
each one of said erector adjustment linking member means passing through one of said passage holes to the interior of said main tube and each linking one of said turrets to said erector tube.

* * * * *